(12) United States Patent
Fischer et al.

(10) Patent No.: US 6,230,835 B1
(45) Date of Patent: May 15, 2001

(54) GROUND EFFECT VEHICLE

(75) Inventors: Hanno Fischer, Willich; Klaus Matjasic, Schwalmtal, both of (DE)

(73) Assignee: Fischer Flugmechanik, Willich (DE)

( * ) Notice: Subject to any disclaimer, the term of this patent is extended or adjusted under 35 U.S.C. 154(b) by 0 days.

(21) Appl. No.: 09/254,256

(22) PCT Filed: Sep. 12, 1997

(86) PCT No.: PCT/DE97/02056

§ 371 Date: Mar. 2, 1999

§ 102(e) Date: Mar. 2, 1999

(87) PCT Pub. No.: WO98/10968

PCT Pub. Date: Mar. 19, 1998

(30) Foreign Application Priority Data

Sep. 14, 1996 (DE) .............................. 196 37 544

(51) Int. Cl.[7] .................. B60V 1/04; B60V 1/11
(52) U.S. Cl. .............. 180/117; 180/126; 114/67 A; 114/273; 114/283; 244/23 R
(58) Field of Search ............................ 180/116, 117, 180/120, 121, 125, 126; 114/67 R, 67 A, 273, 272, 283; 244/12.1, 23 R, 23 D, 49, 47

(56) References Cited

U.S. PATENT DOCUMENTS

| 3,139,059 | * | 6/1964 | Hanford, Jr. ............... 114/273 |
| 3,322,223 | | 5/1967 | Bertelsen . |
| 3,481,297 | * | 12/1969 | Mantle . |
| 4,080,922 | * | 3/1978 | Brubaker ................. 114/282 |
| 4,354,646 | * | 10/1982 | Raymer .................... 244/87 |
| 5,181,674 | * | 1/1993 | Apgar ...................... 244/47 |
| 5,273,238 | | 12/1993 | Sato . |
| 5,373,800 | | 12/1994 | Steinberg . |
| 5,427,329 | * | 6/1995 | Renzelmann et al. ........ 244/49 |

FOREIGN PATENT DOCUMENTS

| 1 813 311 | | 7/1970 | (DE) . |
| 25 23 938 A1 | | 12/1976 | (DE) . |
| 27 20 141 A1 | | 11/1978 | (DE) . |
| 37 29 989 A1 | | 3/1989 | (DE) . |
| 40 10 877 A1 | | 10/1991 | (DE) . |
| 42 10 584 A1 | | 10/1993 | (DE) . |
| 42 17 374 A1 | | 12/1993 | (DE) . |
| 44 05 152 | | 9/1994 | (DE) . |
| 2 281 272 | | 3/1976 | (FR) . |
| 936763 | * | 9/1963 | (GB) ................. 180/116 |
| WO 96/00164 | | 1/1996 | (WO) . |

OTHER PUBLICATIONS

Wing in ground effect craft, part III operational qualities of Ram–Wingsby D. Stinton (Ship & Boat International Jul./Aug. 1995.

* cited by examiner

*Primary Examiner*—Brian L. Johnson
*Assistant Examiner*—Avraham H. Lerner
(74) *Attorney, Agent, or Firm*—Herbert Dubno; Andrew Wilford

(57) ABSTRACT

The invention concerns a ground effect vehicle comprising hydrofoils or hydrofoil outer parts (18) which can pivot about a parallel line relative to the longitudinal axis of the body in order to increase the speed range when flying close the ground. In addition, the hydrofoils and the body can be provided with trailing edge flaps (19) which are articulated so as to pivot about a horizontal axis and, depending on the selected angle of incidence of the hydrofoils or hydrofoil parts, can be controlled as lift-increasing ailerons or flippers.

4 Claims, 7 Drawing Sheets

GROUND EFFECT VEHICLE

CROSS REFERENCE TO RELATED APPLICATIONS

This application is the US national phase of PCT application PCT/DE97/02056 filed Sep. 12, 1997 with a claim to the priority of German application 196 37 544.4 filed Sep. 14, 1996.

FIELD OF THE INVENTION

The invention relates to a ground-effect vehicle with a hull body that has downwardly directed lateral legs as well as support wings on both sides.

BACKGROUND OF THE INVENTION

Such ground-effect vehicles are known from German 4,405,152. As described there, in order to start a ground-effect vehicle an aerostatic lift is first used that is produced in that air is forced through a drive unit into a generally closed space under the supporting lower surface of the hull so that its super-atmospheric pressure creates lift. Once the ground-effect vehicle is moving forward the air pressure forces up the flaps of the wings so that the forwardly directed inlet opening allows air into the space between the bottom of the vehicle and the water or land. Since the sides and rear of this space remain closed, the forward movement of-the vehicle causes a buildup of the aerodynamically created air pressure and the overpressure that creates the aerodynamic ground-effect lift. According to the known ground-effect vehicles there is nonetheless the problem that to produce a dynamic air cushion sufficient to lift the vehicle out of the water a starting velocity dependent on the surface loading is required. Since, relative to air, water is some 800 times more dense, there is about 2 to 2.7 times greater resistance opposed to resistance when in the air, and this increases as the lift speed increases. In order to achieve this, the surface loading must be maintained relatively low which leads to large wing sizes (spans). In order to limit the necessary excessive drive load needed for starting as compared to that needed for flying, lateral wings are provided as end plates underneath a relatively large hull body and these serve also as outrigger floats like on a catamaran float. The rear of the pressure space is closed by the support wing rear edges that are set against the flow direction. A common problem of all ground-effect vehicles is that the increase in lift created by the ground effect with simultaneous reduction in resistances is only usable when there is a relatively small space between the support surface and the ground or water. This spacing which can be considered the flying altitude can only be maintained when there are no obstructions to fly over. This creates the risk that the ground-effect vehicle is stalled as a result of actuating the elevators, which makes recovery like an aircraft impossible due to the limited flying altitude. In addition when the elevators are lowered there is the danger that the wings of greater span while turning actually touch the water or ground. For this reason one must not use the maximum wing span that is most useful for starting, which is also a problem as a result of the larger space and the increased weight, the limited maneuverability when docking, entering a port, and the limited usability in rivers, canals, docks, and the like. In addition the necessary power for starting cannot be used as in an airplane to increase the travel speed. Since the angle is smaller with increasing air speed, the leading surface relative to the trailing surface is increasingly smaller at the rear edge so that the increased lift is lost as well as the automatic altitude stability. This is needed for the safe use of ground-effect vehicles in order to avoid touching the water when flying.

OBJECTS OF THE INVENTION

It is an object of the present invention to improve on the described ground-effect vehicle in that the surface loading at starting is minimized by the greatest possible surface in order to achieve a smaller water-leaving speed, while increasing same in flight.

SUMMARY OF THE INVENTION

This object is achieved by the ground-effect vehicle with a hull and on each side a wing of having an outer part that can be pivoted up about a respective rotation axis relative to a respective inner part closer to the hull so that as a result of the pivoting a surface loading corresponding to the current speed is maintained with an optimum setting angle and where each inner wing part has rear flaps that are selectively controllable relative to a hull longitudinal axis, the wing and flaps being such that a vertical altitude change can be established without changing the hull position and that rear flaps on the outer wing parts are effective as ailerons, side rudders, and air brakes. The outwardly arranged parts of the wings are pivotal upward, preferably through an angle up to 90°. In this manner the surface loading can be adjusted to the current operating conditions by changing the support surface producing the lift. In order to increase the usable speed span, according to the invention the supporting surface can be reduced while in flight so that the necessary positive setting angle can also be maintained even at high speed. The rotation axis is selected such that when pivoted up there is minimal resistance near zero. A further advantage is that the wing span can be reduced for entering ports or traveling in rivers, canals, or locks so that even narrow waterways can be negotiated. In order to increase the maneuverability of the ground-effect vehicle, in particular to avoid collision with obstacles such as ships, islands, land masses, bodies floating in the water, icebergs, and the like, it is desirable to have a small turning radius and rapid altitude changes. To this end the rear-edge flaps on the hull and on the wings, ma be individually controllable symmetrically or asymmetrically to the vehicle longitudinal axis. Separate rear-edge flaps can be differently deflected in order to assume an inclined position for coordinated turning flight. For example the flaps on the inner part that is formed only by the hull or the hull and the inner wing parts, can be operated identically to the landing flaps on aircraft so that the lift and the altitude can be suddenly increased without increasing the angle of incidence. The angular position of the hull and therefore of the passengers remains the same. Furthermore this eliminates stalling that is caused by too large an angle of incidence. This is a particular problem with a low flight where there is no room to recover. Furthermore it is not necessary to actuate an elevator to level out when landing. The necessary altitude control and the level-control elevator and its controls can be eliminated. As a result of the decreased cost of control of the ground-effect vehicle special training and licenses for the pilot are not needed. The wing and flap arrangement is so selected that altitude changes of the ground-effect vehicle can be made without changing the angle of the hull which greatly increases passenger comfort. This is achieved by positive or (preferably) negative sweep-back which compensates for the moments about the center of mass of the ground-effect vehicle. The flap arrangement can be combined with the rear-edge flaps of the outer wing parts so that the altitude and the angle are jointly controlled.

By coupling the wing and hull inner flaps with the wing outer flaps one can simultaneously ascend while turning so that the outer flaps will not hit the water. The rear flaps arranged on the outer wing parts are in particular so controlled and pivoted that they act as ailerons, side rudders, and/or as air brakes. Appropriate rear-edge flaps on the outer wing parts allow a brake effect to be achieved by pivoting them inward so that the flow over the upstream support surface is disturbed and lift is reduced and one descends more quickly to the water. As a result of this braked sudden dropping of the ground-effect vehicle the overall stopping distance to water contact is decreased. The pivot axis of the outer wing parts is set at an angle such that when tipped up the effective angle of incidence is so small that the thus produced angle produces the least resistance. There is thus a reduction without further production of lift that is neither necessary nor desirable in these conditions.

Rear edge flaps are arranged on the hull and/or on the wings which are pivotal about horizontal axes. Such rear edges are known basically in aircraft as landing flaps or ailerons. In ground-effect vehicles they have the advantage that the rear-edge flaps control the altitude so that not only the otherwise necessary elevator can be eliminated, but also the pilot need not have to worry about operating it. Actuating the rear-edge flaps forces the ground-effect vehicle up so that, as a result of the greater altitude, contact with the ground or water at the wing tips is impossible.

Further embodiments of the ground-effect vehicle are described in the dependent claims.

According to a further embodiment of the invention the hull is formed as a catamaran having sides in particular formed as floats. Formation as a catamaran produces a very stable watercraft as well as a resistance to capsizing caused by the wind or likely in a slowly moving ground-effect vehicle.

The outwardly arranged wing parts according to a further embodiment of the invention are formed as pivotal two-arm levers and are coupled so on the inner wing parts that the upwardly pivoted wing part forms a downwardly directed end plate whose free end lies below the inner wing part and thus outwardly closes a space formed under the inner wing part. This arrangement can produce a surface with a considerable lift potential for starting the ground-effect vehicle so as to reduce the starting speed and the necessary horsepower. As the flight speed increases the angle of incidence decreases to the optimum for the best flight trajectory. In order not to exceed this angle, which also limits the speed with automatic altitude maintenance. the outer wing (wing outer part) is pivoted upward in steps or continuously so that the surface loading for the actual speed maintains the optimal angle of incidence. Control of the pivotal wing outer parts (or of the wing) is such that the angle of incidence until vertical is reduced so that these produce as winglets the least possible resistance, but simultaneously the end-plate effect described above increases the effective lateral ratio. Preferably the pivot axis between the inner wing part and the outer wing part lies in the region of the upper surface of the inner wing part and the common surfaces of the inner wing part and outer wing part in unpivoted condition extend at an incline to the central (horizontal) plane of the ground-effect vehicle. As a result of this inclined common surface and the position of the pivot axis, when not pivoted, a common planar wing underside is presented and the inclined surfaces of the outer wing part after corresponding upward pivoting form the inner lateral end plates. As a result the number of parts of the wing and the controls therefor are reduced to a minimum.

The actuator for pivoting the outer wing part is elastically mounted in order to absorb stresses created by touching the water which are greater than the maximum stresses normally encountered during flight. Such spring elements can be formed by pneumatic devices or elastic intermediate bodies. The amount of spring effect is set such that air loads during flight are withstood without vibration but greater stresses, e.g. when hitting a wave in the water, are compensated for by deflection. As a result of this not only the outer surfaces but also the inner surfaces of the wings can be made lighter by reducing the connecting forces. At the same time the vertical acceleration loads are reduced during startup which leads to a further destressing and increase in passenger comfort.

BRIEF DESCRIPTION OF THE DRAWING

Embodiments of the invention are shown in the drawings. Therein.

SPECIFIC DESCRIPTION

The ground-effect vehicles shown in FIGS. 1 to 15 all have a hull having downwardly projecting sides formed as floats 16 as well as a center part 17 formed as a passenger cabin. On each side of the hull is a wing that can be tipped up through up to 90° either wholly or at its outer end. The pivotal parts are shown at 18. Rearward of the hull and of the wings are rear-edge flaps 19 and 20 that are pivotal about respective horizontal axes of the ground-effect vehicle. The ground-effect vehicle can be set up not as the illustrated catamaran construction but as a pure air-cushion vehicle or an air boat. The drive elements as well as the devices for limiting the air cushion are left out for clarity's sake and can be made as described in German 4,405,152 to which reference is expressly made. Dashed line S runs through the center of mass of the ground-effect vehicle or that point at which all the various forces are effective.

Figure 1:
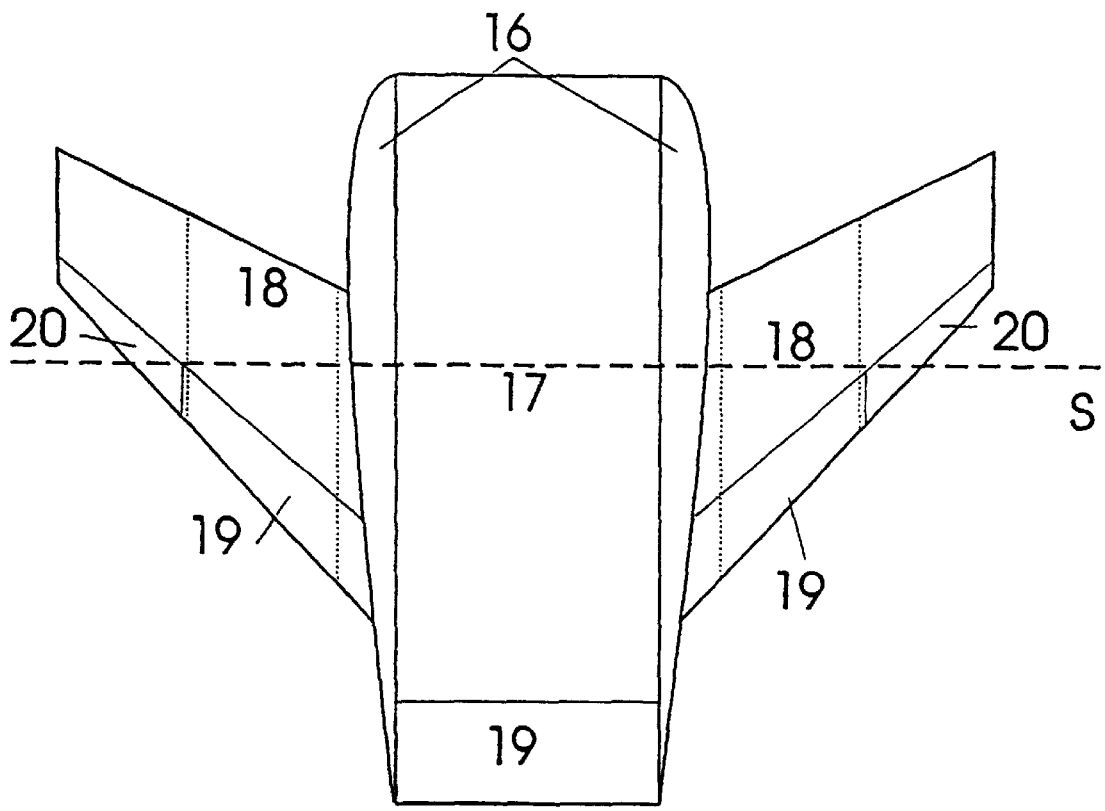
FIG. 1 is a top view of a ground-effect vehicle with a hull formed like a catamaran and two support wings.
Figure 2:
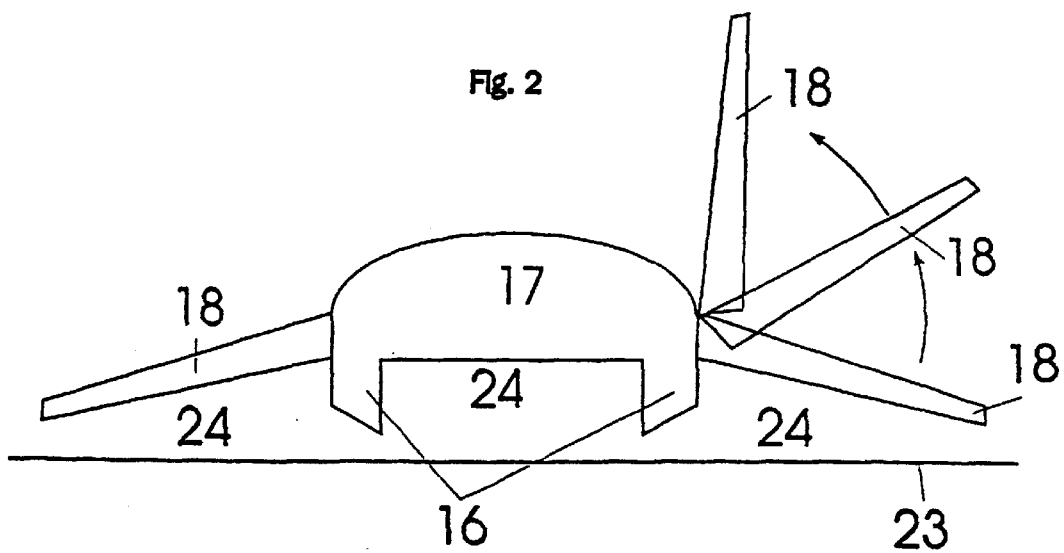
FIG. 2 is a front view of the ground-effect vehicle according to FIG. 1 in the starting wing position on the left side and various raised position of the support wing on the right side.

When starting and running an air cushion is formed underneath the center part 17 and the lowered generally horizontal wings 18 in the spaces 24 between the ground-effect vehicle and the water or ground surface 23. The formation of the static or dynamic air cushion is described in detail in German 4,405,152. The wing 18 on the left in FIGS. 1 and 2 as well as the corresponding right wing in the lower position are in the starting position in which the biggest possible aerostatic lift corresponding to the full wingspan is used. As shown for the wing on the right the wings 18 can be pivoted symmetrically or asymmetrically through selected angles after the start phase in discrete or continuous stages to achieve cruising speed. A corresponding upward pivoting can also be used to travel in narrow channels, or to enter a port or lock. In the embodiment of FIG. 2 each of the wings 18 is one piece.

Figure 3:
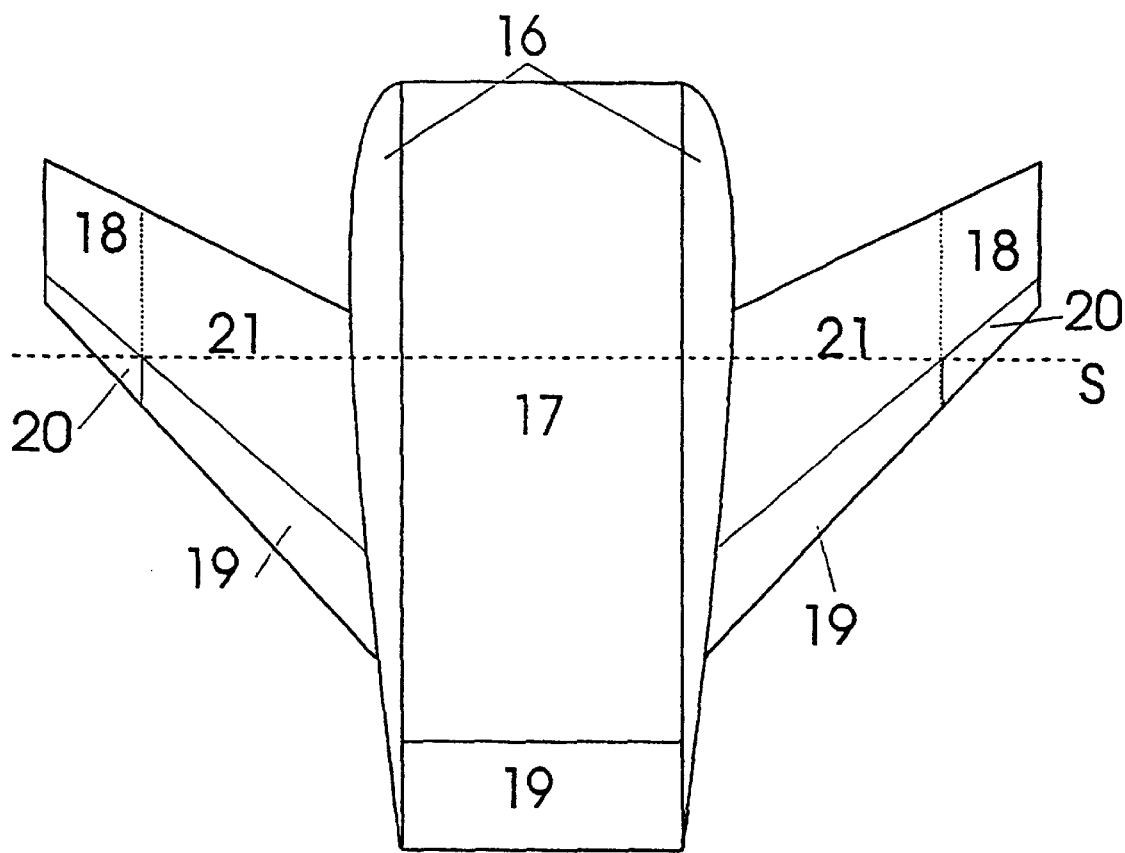
FIG. 3 is a top view of a ground-effect vehicle with a catamaran-like hull, wings on both sides having pivotal outer wing parts.
Figure 4:
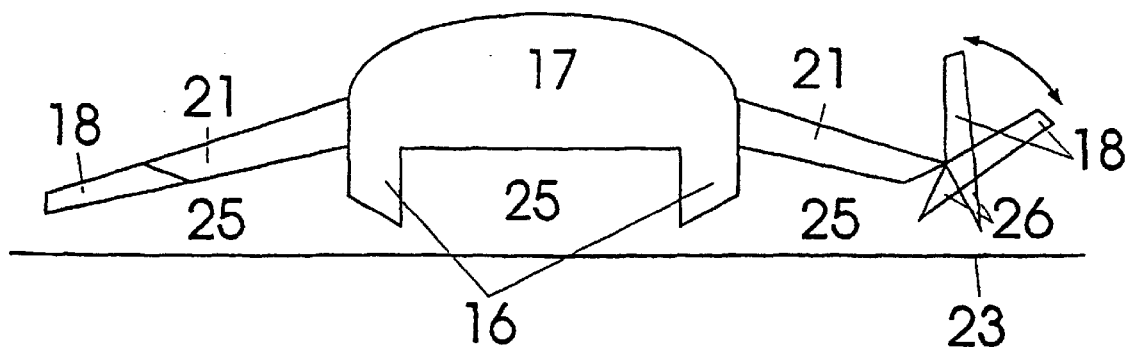
FIG. 4 is a front view of the ground-effect vehicle according to FIG. 3 with different angular positions of the outer wing parts.
Figure 5:
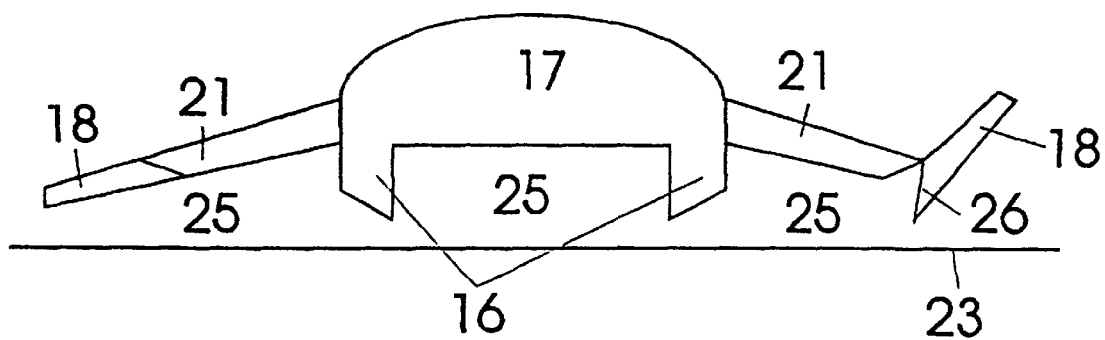
FIG. 5 is a view like FIG. 4 with other settings of the support wings.

In contrast, FIG. 3 shows an arrangement of wings wherein only the outer wing part 18 is pivotal. The inner wing part 21 is fixed against pivoting on the hull of the ground-effect vehicle. As shown on the left in FIG. 4, the entire surface of the wing parts 18 and 21 is not vertical but angled so that, when the outer wing parts 18 are swung up, downwardly directed end plates 26 are formed that laterally delimit the air space 25 in the cruise position. In this manner during the starting phase with an upwardly pivoted wing part one is insured better aerodynamic lift. FIG. 5 shows an outer wing part swung through a different angle with a correspondingly reduced air space 25 in the cruise position.

Figure 6:
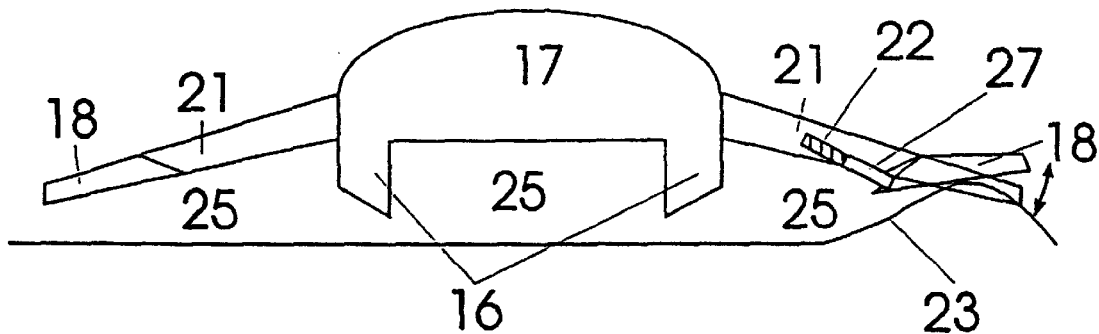
FIG. 6 is an arrangement like FIG. 4 or 5 with spring-mounted outer wing parts.
Figure 7:
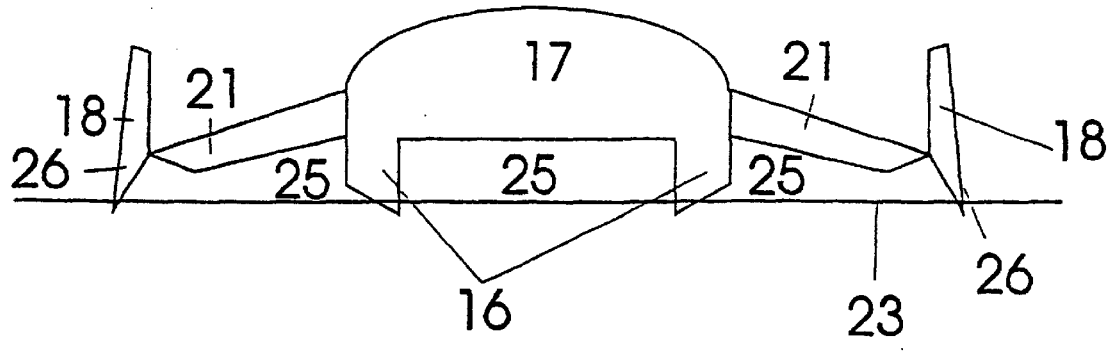
FIG. 7 is a view of the ground-effect vehicle according to FIGS. 4 to 6 with both outer wing parts flipped up to reduce span.

FIG. 6 shows a hydraulic actuator 27 for setting the pivot angle of the outer wing part 18 that is mounted via a spring element 22 so that during gliding over wavy water (see wave 23) the outer wing part 18 can yield when it touches the water. The spring constant is such that aerostatic or aerodynamic forces are not effective but touching a wave is. As described with reference to FIG. 2 when traveling in a harbor, lock, or the like with limited clearance the outer wing parts 18 are swung up.

Figure 8:
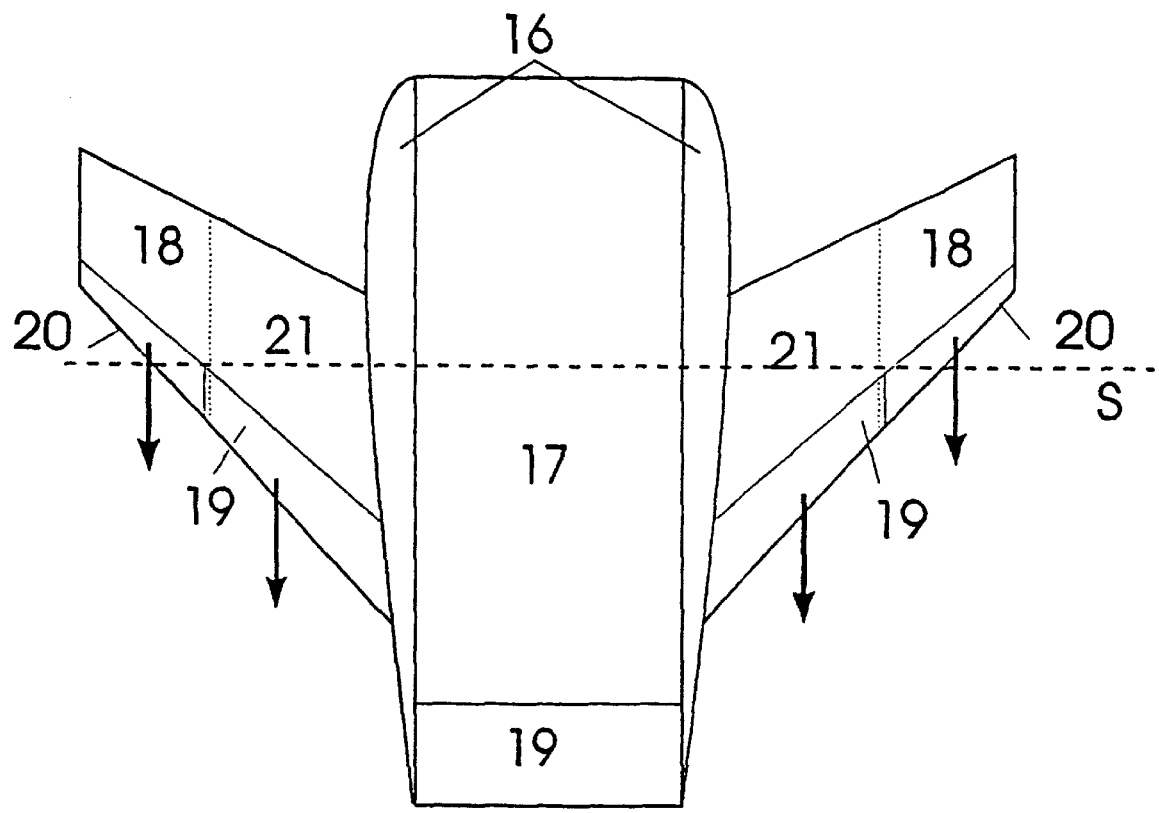
FIG. 8 is a top view of a ground-effect vehicle with downwardly deflected support-wing rear-edge flaps.
Figure 9:
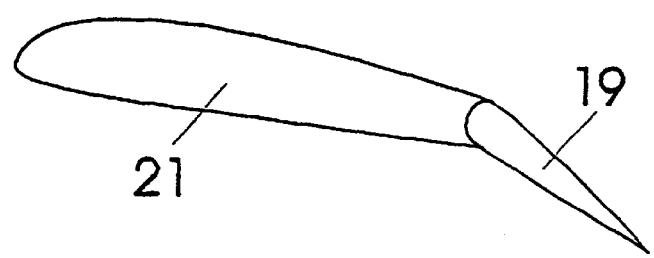
FIG. 9 is a section through a support wing with positive flap deflection.
Figure 10:
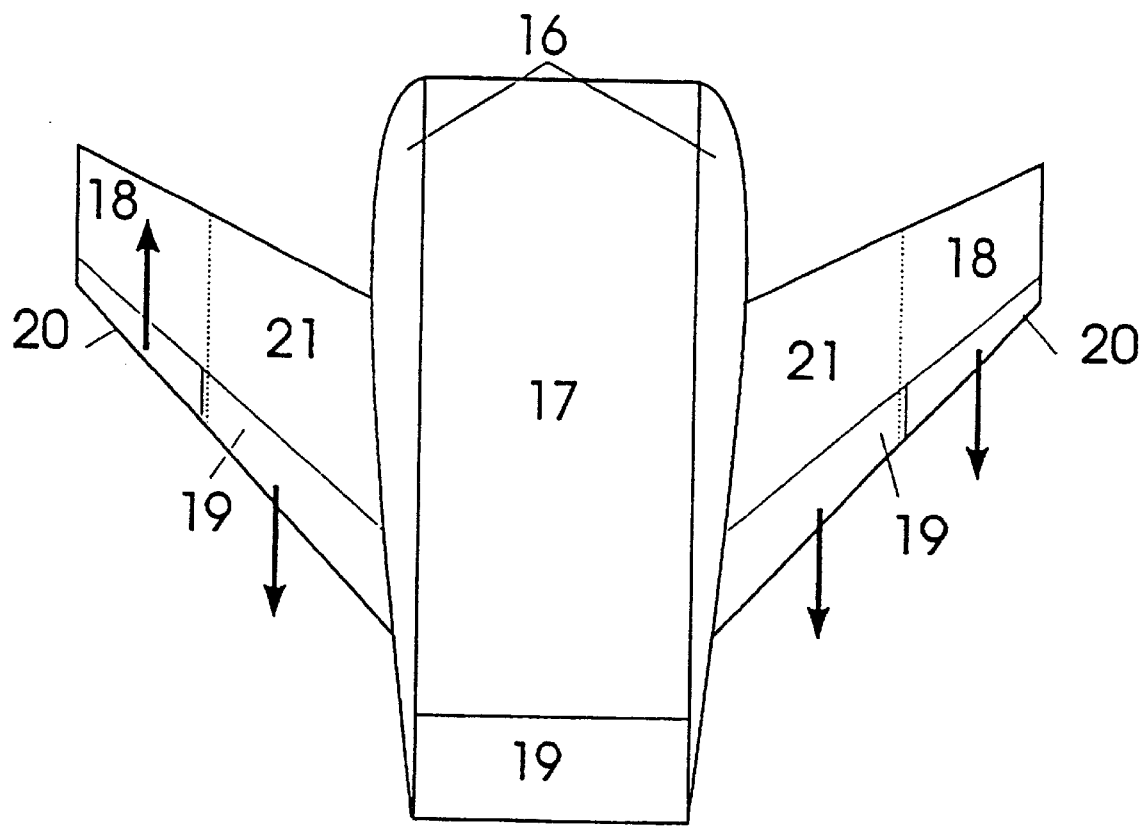
FIG. 10 is a top view of a ground-effect vehicle with asymmetrical flap positions to set an inclined position.
Figure 11:
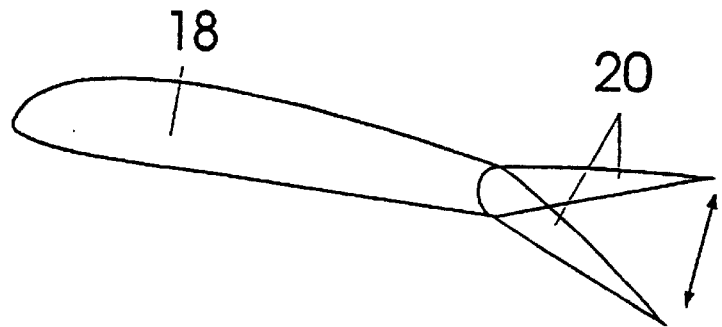
FIG. 11 is a section through an outer support wing part with different rear-flap positions.
Figure 12:
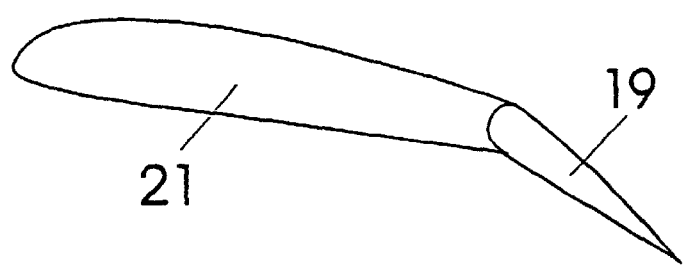
FIG. 12 is a section like FIG. 11 with a further rearflap position.

As seen in FIGS. 9, 11, and 12 the rear-edge flaps 20 of the pivotal wing parts 18 as well as the rear-edge flaps 19 of the inner wing parts 21 or of the central hull part 17 are each pivotal about a horizontal axis. Preferably each of the rear-edge flaps 19 and 20 is independently pivotal so that symmetrical or asymmetrical flap positions are possible. FIGS. 8 and 9 each show downwardly deflected flaps 19 and 20 that in the illustrated position effect an altitude change for the ground-effect vehicle. FIGS. 10 and 11 show that by asymmetrical flap positioning on the outer wing parts 18 angled positions of the ground-effect vehicle are settable for turning. To this end rear edge flaps 20 on the side shown in the right in FIG. 1 are deflected upward and on the opposite right side downward (see the settings of FIG. 11). The rear-edge flaps 19 have in contrast about the same position as the downwardly deflected rear-edge flaps 20 (FIG. 10 on the right).

Figure 13:
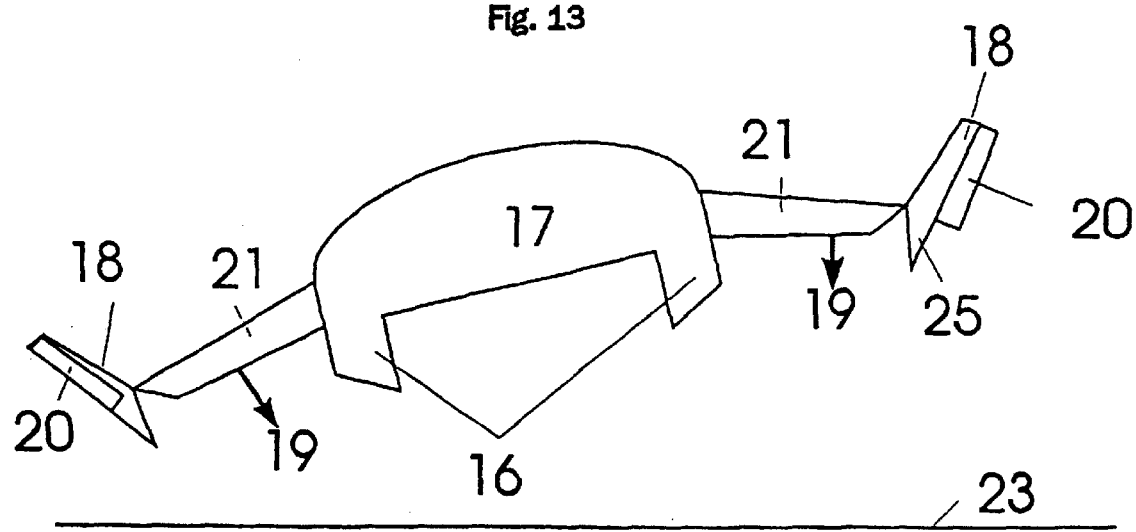
FIG. 13 is a rear view of a ground-effect vehicle while turning with simultaneous altitude change by selective setting of the flaps.

The corresponding rear views of the wing and rear-edge flaps shown in FIGS. 10 and 12 can be seen in FIG. 13. With roughly the same deflection angle of the wing outer parts 18 the rear-edge flap 20 of the left outer wing part 18 is pivoted up while the rear-edge flap 20 on the other side is pivoted down. The rear-edge flaps 19 on the inner wing parts 21 are pivoted downward differently, that is at different angles, as illustrated by the arrows of different length. The pivoting of the rear-edge flaps 19 downward with the illustrated flight turn increases the distance from the ground or water surface 23.

Figure 14:
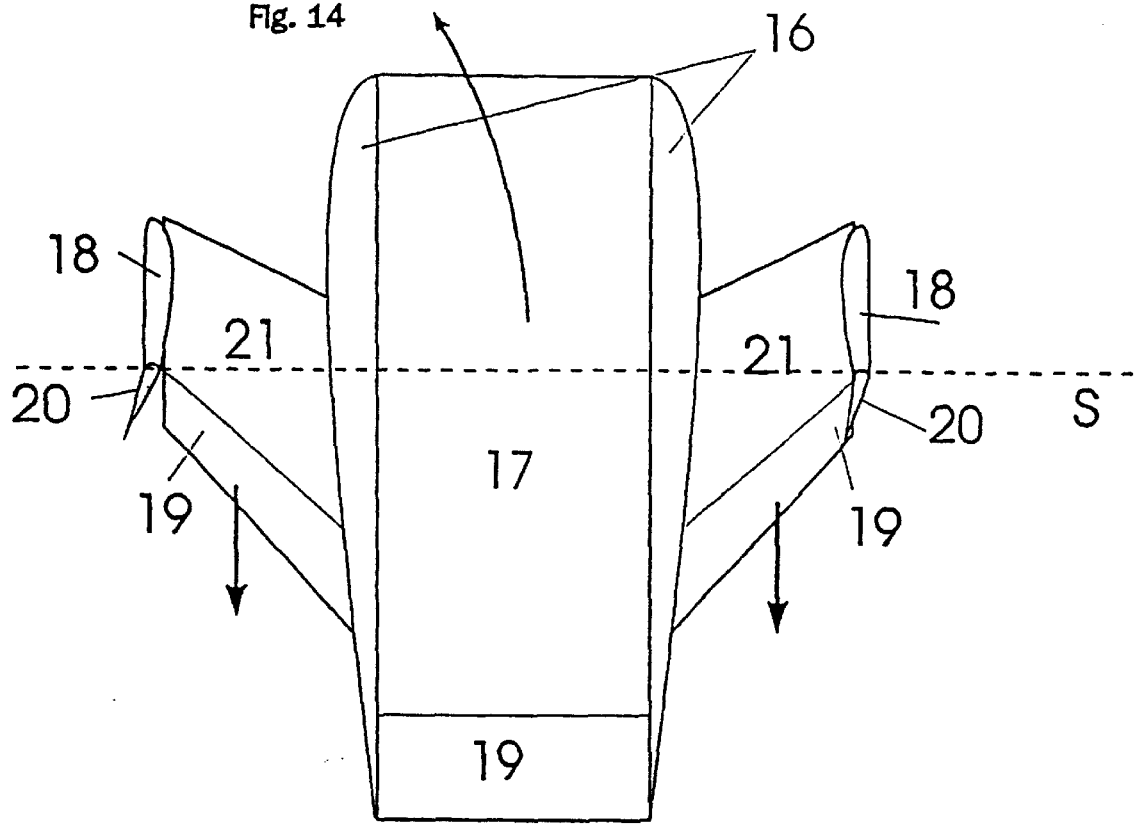
FIGS. 14 and 15 are top views of a ground-effect vehicle with outer wing parts up and different rear-flap positions of the outer parts.

FIG. 14 shows how with raised outer wing parts 18 the rear-edge flaps 20 act as side rudders. Downward (left) or upward (right) pivoting of the rear-edge flaps 20 leads as a result of the vertical position of the outer wing part 18 to a lateral pivoting of the rear-edge flaps 20 to initiate a flight curve to the left. The positive and negative pivot angles for the rear-edge flaps 20 can be of the exact same size or be of different sizes.

Figure 15:
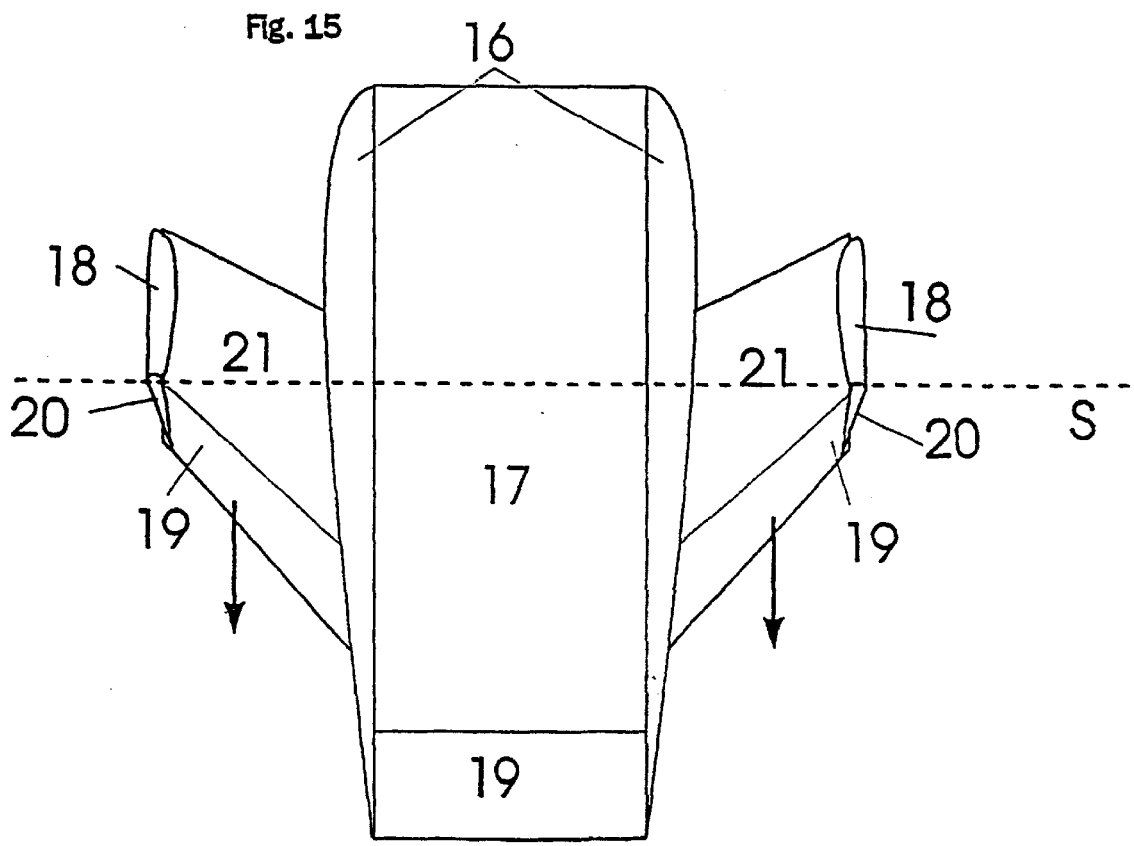

According to FIG. 15 both rear-edge flaps 20 are pivoted upward relative to the wing outer parts 18 which as a result of the vertical setting leads to an inward pivoting of the rear-edge flaps 20 which has a braking effect. This braking effect also reduces the lift of the outer edges as a result of the flow, that is the ground-effect vehicle can drop quickly into the water surface.

What is claimed is:

1. A ground-effect vehicle with a hull and on each side a wing having a respective outer part can be pivoted up relative to a respective inner part closer to the hull so that as a result of the pivoting a surface loading corresponding to the current speed is maintained with an optimum setting angle and where each inner wing part has rear flaps that are selectively controllable relative to a hull longitudinal axis, the wing and flaps being such that a vertical altitude change can be established without changing the hull position and that rear flaps on the outer wing parts are effective as ailerons, side rudders, and air brakes, the outer wing parts being formed as pivotal two-arm levers coupled so on the inner wing parts that, when upwardly pivoted, the outer wing parts each form a downwardly directed end plate whose free end lies below the respective inner wing part and thus outwardly closes a space formed under the respective inner wing part.

2. The ground-effect vehicle according to claim 1 wherein the pivot axis between the inner wing part and the respective outer wing part lies adjacent an upper surface of the inner wing part and common surfaces of the inner wing part and outer wing part in unpivoted condition extend at an incline to a central plane of the ground-effect vehicle.

3. The ground-effect vehicle according to claim 2 wherein an actuator for pivoting the outer wing part is elastically mounted in order to absorb stresses created by touching the water which are greater than the maximum stresses normally encountered during flight.

4. The ground-effect vehicle according to claim 3 wherein the rear-edge flaps of the hull and the inner wing parts are so connected with the rear-edge flaps of the outer wing parts that, when the ground-effect vehicle is tilted by asymmetrical actuation of the outer rear-edge flaps, the inner rear-edge flaps are operated positively to increase spacing above the ground or water.

* * * * *